United States Patent
Blareau et al.

(10) Patent No.: US 8,119,379 B2
(45) Date of Patent: Feb. 21, 2012

(54) METHOD FOR THE PRODUCTION OF AN IMMUNOSTIMULANT MILK PRODUCT AND USES THEREOF

(75) Inventors: Jean-Pierre Blareau, Steenvoorde (FR); Marie-Bénédicte Romond, Lille (FR); Charles Romond, La Madeleine (FR); Francis Lecroix, Godewaersvelde (FR); Charles Gontier, Malemort-sur-Correze (FR)

(73) Assignee: Compagnie Gervais Danone (FR)

( * ) Notice: Subject to any disclaimer, the term of this patent is extended or adjusted under 35 U.S.C. 154(b) by 424 days.

(21) Appl. No.: 12/167,630

(22) Filed: Jul. 3, 2008

(65) Prior Publication Data

US 2008/0268099 A1 Oct. 30, 2008

Related U.S. Application Data

(62) Division of application No. 10/019,872, filed as application No. PCT/FR00/01946 on Jul. 6, 2000, now Pat. No. 7,410,653.

(30) Foreign Application Priority Data

Jul. 6, 1999 (FR) ...................................... 99 08691

(51) Int. Cl.
*C12P 1/04* (2006.01)
*C12N 1/20* (2006.01)

(52) U.S. Cl. ..................... 435/170; 435/252.1; 424/535; 424/93.4

(58) Field of Classification Search .................. 424/520, 424/400, 439, 535, 93.4; 435/170, 252.1
See application file for complete search history.

(56) References Cited

U.S. PATENT DOCUMENTS

| | | | |
|---|---|---|---|
| 4,091,117 A | * | 5/1978 | Mutai et al. ..................... 426/43 |
| 4,187,321 A | | 2/1980 | Mutai et al. |
| 4,753,926 A | | 6/1988 | Lucas et al. |
| 4,853,246 A | | 8/1989 | Stevens |
| 5,230,912 A | | 7/1993 | Yajima et al. |
| 5,711,977 A | | 1/1998 | Yang et al. |
| 5,902,578 A | | 5/1999 | Halpin-Dohnalek et al. |
| 6,034,130 A | | 3/2000 | Wang et al. |

FOREIGN PATENT DOCUMENTS

| | | |
|---|---|---|
| FR | 82 506 129 A | 11/1982 |
| FR | 2 560 046 A | 8/1985 |
| FR | 0 577 904 A1 | 1/1994 |

OTHER PUBLICATIONS

Derwent Publications Ltd.; Abstract; Apr. 1, 1996; AN 2000-021383, XP-002132830 & PH 29 583 A; London, GB.

* cited by examiner

*Primary Examiner* — Ruth Davis
(74) *Attorney, Agent, or Firm* — Alston & Bird LLP

(57) ABSTRACT

A method for the production of an immunostimulant milk product, characterized in that bioconversion is carried out on or a milk substrate with the aid of a *Bifidobacterium* culture by keeping said substrate in contact with said culture in conditions which are unfavorable with respect to the fermentation of *Bifidobacterium*. The invention also relates to milk foods and products obtained by said method.

5 Claims, No Drawings

METHOD FOR THE PRODUCTION OF AN IMMUNOSTIMULANT MILK PRODUCT AND USES THEREOF

CROSS-REFERENCE TO RELATED APPLICATIONS

This application is a divisional of U.S. application Ser. No. 10/019,872, filed Apr. 2, 2002, which is a national stage application of PCT/FR00/01946, filed Jul. 6, 2000, now U.S. Pat. No. 7,410,653 claiming priority from French Application No. FR99/08691, filed Jul. 6, 1999, which are hereby incorporated herein in their entirety by reference.

FIELD OF THE INVENTION

The present invention relates to the use of bifidobacteria for the preparation of immunostimulant milk foods which are suitable in particular for use as infant food: foods which may be in liquid or powdered form.

BACKGROUND OF THE INVENTION

The genus *Bifidobacterium* belongs to the Actinomycetaceae family; it groups together Gram-positive bacilli which are strict anaerobes fermenting glucose by the fructose-6-phosphate phosphoketolase pathway. Their optimum pH for growth is between 6 and 7, and their optimum temperature for growth is between 37 and 40° C.

Bifidobacteria are part of the normal human intestinal flora and they are recognized to have numerous beneficial effects on health. It is in particular known that breast-fed unweaned babies who possess an intestinal flora in which bifidobacteria are predominant are more resistant to infections and have in particular a lower risk of diarrhea than unweaned babies fed with industrial milk preparations.

The role of bifidobacteria in this increased resistance to infections has not been completely elucidated. Various studies indicate that they possess an immunostimulant power which would involve polysaccharide substances associated with the bacterial wall, or secreted by the bacteria during anaerobic fermentation. GOMEZ et al., [FEMS Microbiol. Lett., 56, 47-52, (1988)] describe the immunomodulatory effect of exocellular fractions rich in polysaccharides produced by *Bifidobacterium adolescentis*; FR Application published under the number 2652590, in the name of Laboratoires OM, describes an immunopotentiative exopolymer of a polysaccharide nature produced by *Bifidobacterium infantis longum*; HOSONO et al., [Biosci. Biotech. Biochem., 61, 312-316 (1997) and Bioscience Microflora, 17, 97-104, (1998)] describe immunopotentiator polysaccharides produced by various *Bifidobacterium* species. The immunomodulatory action of bifidobacteria also manifests itself by the regulation of the intestinal microflora, in particular at the expense of the development of pathogenic bacterial species. ROMOND et al., [Anaerobe, 3, 137-143, (1997), and J. Dairy Sci., 81, 1229-1235, (1998)] thus describe glycoprotein-rich fractions produced by *Bifidobacterium breve* under anaerobic fermentation conditions, and inducing in vivo a regulatory effect on the intestinal microflora.

Numerous products fermented by bifidobacteria, optionally combined with other lactic acid bacteria, exist on the market whose ingestion make it possible to benefit from the immunostimulant effects of bifidobacteria and of their fermentation products.

In the case of infant nutrition, however, they have the disadvantage of being too acidic and of having, in particular in the case of powdered products, a nonhomogeneous appearance after reconstitution, because of the coagulation of the milk proteins by the acidity generated during fermentation. They are therefore sometimes poorly accepted by the child or by the mother.

However, the inventors have now discovered that the production, by bifidobacteria, of substances having immunostimulant properties could be carried out without fermentation, and therefore without acidification of the final product.

SUMMARY OF THE INVENTION

The subject of the present invention is a method for the production of an immunostimulant milk product, characterized in that bioconversion is carried out on a milk substrate with the aid of a *Bifidobacterium* culture by keeping said substrate in contact with said culture, under conditions which are unfavorable to fermentation by *Bifidobacterium*.

The expression "conditions which are unfavorable to fermentation by *Bifidobacterium*" defines conditions under which the acidification of the medium by *Bifidobacterium* does not exceed 0.5 pH units during 8 hours of incubation for an initial inoculation of 1 to $5 \times 10^7$ CFU per ml. They can be easily determined by persons skilled in the art with the aid of simple trials, by varying in particular the aeration of the culture medium, its osmotic pressure and/or the culture temperature, and by measuring the pH at the beginning and at the end of the culture.

For a large number of *Bifidobacterium* strains, such conditions may be obtained in particular by:
  keeping under aerobic conditions, for example with stirring;
  keeping the medium at an osmotic pressure corresponding to a water activity (AW) of 0.93 to 0.97;
  keeping at a temperature of 40 to 48° C.;
  as well as combinations of these various conditions.

The milk substrate and the *Bifidobacterium* may be brought into contact at the rate of $1 \times 10^7$ to $1 \times 10^9$ CFU per ml of milk substrate, and the final *Bifidobacterium* population at the end of the bioconversion reaction is $1 \times 10^5$ to $1 \times 10^9$ CFU per ml of product.

The pH of the milk substrate during the bringing into contact with the bacteria is preferably 6.3 to 7 and the pH of the product at the end of the bioconversion reaction is preferably 6 to 7.

Depending on the conditions used, the duration of contact between the milk substrate and the bacteria will be 6 to 24 hours.

The milk substrate may be milk, or any milk-based medium; this may be for example a milk concentrate, a base for infant milk food, a base for yogurt, and the like.

It is possible to add to the milk-based medium the ingredients necessary for producing the product ready for consumption which it is desired to obtain. If, for example, it is desired to obtain a milk food for unweaned babies, lactose, maltodextrins, minerals, vitamins, fat, and ingredients which make it possible to reconstitute the composition of breast milk, will be added. If desired, the fat is incorporated and then homogenized with the solution so as to obtain a stable emulsion.

The *Bifidobacterium breve* strain which is particularly suitable for carrying out the invention, was deposited in accordance with the Budapest Treaty, on May 31, 1999, under the number I-2219 at the CNCM (Collection Nationale de Cultures de Microorganismes) held by Institut Pasteur, 25 rue du Docteur Roux, in Paris.

This strain has the following characteristics:
morphology: short bacilli with rare Y and V shapes
metabolism: anaerobiosis; production of L-(+)-lactic and acetic acids.
fermentation of sugars: glucose, galactose, fructose, maltose, sucrose, lactose, esculin, ribose, mannitol, sorbitol, D-raffinose, melibiose.

The subject of the present invention is also a liquid milk product characterized in that it may be obtained using a method in accordance with the invention.

This product preferably has, at the end of the bioconversion reaction, a pH of 6 to 7.

By way of comparison, the prior art products obtained by fermentation by *Bifidobacterium* have, at the end of fermentation, a pH of 4 to 4.6.

This product may be consumed as it is, or may be subjected to various treatments whose nature varies according to the ready-to-eat product which it is desired to obtain. It may, for example, be supplemented with texturing agents, flavoring agents, vitamin or mineral supplements, fat and the like, if these were not added to the original medium. It may also be concentrated or diluted.

A milk product in accordance with the invention can serve as base for the preparation of fresh milk foods.

Advantageously, it may also be used for the preparation, by sterilization and/or dehydration, of foods with long shelf life. Indeed, it preserves its immunostimulant properties even in the absence of live bacteria, for example after desiccation and UHT sterilization.

The present invention also covers the fresh, sterilized or dehydrated milk foods obtained from a milk product in accordance with the invention.

It also covers the reconstituted milk foods obtained by adding water to the dehydrated milk foods in accordance with the invention.

The (fresh, sterilized or reconstituted) milk foods in accordance with the invention generally have a pH of 6 to 7.5, preferably of 6.5 to 6.9.

Unlike the foods resulting from fermentation by *Bifidobacterium* which are known in the prior art, the milk foods in accordance with the invention are not acidic, and contain the milk proteins in soluble, noncoagulated form. Upon addition of water to the dehydrated milk foods in accordance with the invention, it is thus possible to obtain a homogeneous product, without precipitation or phase separation.

The milk foods in accordance with the invention, by virtue of their immunostimulant effect, confer protection against microbial and viral infections comparable to that of the foods resulting from fermentation by *Bifidobacterium* which are known in the prior art, without having the disadvantages thereof in terms of modification of the taste and of the appearance of the product. They are particularly suitable for use as infant food, and in particular as food for unweaned babies, but they may also be used as food for subjects of all ages.

ILLUSTRATIVE EXAMPLES

The present invention will be understood more clearly with the aid of the additional description which follows, which refers to examples of preparation of milk products in accordance with the invention.

Example 1

Manufacture of a Powdered Dietetic Milk Preparation for Unweaned Babies, with Immunostimulant Activity A milk concentrate is prepared whose composition, expressed in g per 100 g of dry matter, is the following:

| | |
|---|---|
| Milk proteins (80% casein and 20% serum proteins) | 13 |
| Vegetable fat | 25.5 |
| Lactose | 42.25 |
| Maltodextrins | 16 |
| Minerals | 3 |
| Vitamins | 0.25 |

The vegetable fat is added to a skimmed cow's milk, heated to 75° C. Homogenization is performed at the same temperature in 2 stages, the first under 200 kgs/cm$^2$, the second under 50 kgs/cm$^2$. The lactose and the maltodextrins, previously dissolved in water, are then added, followed by the solutions of vitamins and minerals.

The final mixture is pasteurized at 115° C. and then concentrated by evaporation to 48% dry matter.

The concentrate, cooled to 37° C., is then inoculated at the rate of 5% with a *B. Breve* I-2219 culture containing $10^9$ bacteria/ml. The initial pH is 6.15 and the osmotic pressure is 0.96.

After incubating for 8 h at 37° C., in a tank under air with periodic stirring for 10 minutes every 2 hours, the pH is 6.1 and the *B. Breve* population is $10^6$ bacteria/ml. The Dornic acidity is 48°D.

The concentrate is spray-dried. The powder obtained, when added to water in an amount of 140 g per liter of water, makes it possible to obtain a reconstituted milk which possesses the following characteristics: pH 6.6, Dornic acidity 12°D; liquid milk appearance with no curd grains.

Example 2

Manufacture of a Ready-to-Use, UHT Sterilized and Aseptically Packaged Dietetic Milk Preparation for Unweaned Babies, with Immunostimulant Activity A mixture is prepared whose composition (in g/liter) is the following:

| | |
|---|---|
| Proteins | 21 |
| Fat | 24 |
| Carbohydrates | 83 |
| Minerals | 5 |
| Vitamins | 0.45 |

This mixture is prepared from the following ingredients (per 100 liters of finished product):
58 liters of skimmed milk,
2.4 kgs of fat,
4.7 kgs of lactose,
0.7 kgs of maltodextrins,
0.3 kg of vitamins,
0.05 kg of mineral complex.

The milk is heat-treated beforehand using the UHT system to a temperature of 115 to 120° C.

The fat is incorporated into the milk which has been cooled to 70° C. and homogenization is performed in 2 stages, 200 kgs during the 1st stage, 50 kgs in the 2nd stage.

The mixture is cooled to 37-38° C., and then inoculated at 1.5% with a CNCM I-2219 culture containing 1 to $5\times10^9$ bacteria/ml.

Incubation is carried out at 37° C. for 8 hours under conditions identical to example 1 above, followed by cooling to 5° C.

The pH of the product is 6.3 and the *B. Breve* population is 3×10$^7$ bacteria/ml. The Dornic acidity is 23°D.

The remainder of the ingredients is dissolved in 50 liters of water approximately and then added to the product obtained at the end of the incubation.

The mixture thus produced is subjected to a UHT treatment at 140° C. for 6 to 7 seconds before being aseptically packaged.

Example 3

Immunostimulant Effect of Milk Products in Accordance with the Invention

The immunostimulant effect of the milk preparations in accordance with the invention was studied as follows:

by the development of fecal flora on mice with human flora;

by the regulation of the phenomenon of translocation on monoxenic mice with *Clostridium perfringens*.

Studies of the Development of the Fecal Flora in Mice with Human Flora:

The mice are of the adult C3H line with human flora.

This is the G1 generation, the G0 generation being axenic mice associated in adulthood with the human flora.

Number of mice per group: 6
Number of trials: 2 per product.

The mice are kept for 1 week in the same cage and then divided 6 to a cage.

The age of the mice at the beginning of the trials is 8 weeks minimum and 11 weeks maximum.

The following will be monitored in the fecal flora:
bifidobacteria
*Bacteroides fragilis*
spores of *Clostridia*
optionally spores of *Cl. Perfringens*

Microbiological Techniques

The fecal sample is collected immediately before use, aseptically weighed and diluted in pre-reduced Ringer's solution (diluted one quarter and supplemented with cysteine hydrochloride at 0.3 g/l).

Enumeration of bifidobacteria and *Bacteroides fragilis* on pre-reduced BEERENS and BBE media inoculated directly and incubated under anaerobic conditions.

For the test for *Clostridium* spores:

the suspensions are heated for 10 minutes at 75° C. and inoculated on Columbia agar supplemented with glucose (5 g/l) and cysteine hydrochloride (0.3 g/l) and incubated for 5 days, the *Clostridium* colonies are identified by their morphology and a negative catalase reaction. The cell morphology is determined after Gram staining 3.

The results obtained with a control milk preparation which had been inoculated with the ferment CNCM I-2219 and administered immediately are illustrated by table I below (contact time=0)

TABLE I

|  | T 0 | T 7 days | T 15 days |
|---|---|---|---|
| *Bifidobacteria* | 8.2 ± 0.3 | 9.3 ± 0.1 | 8.6 ± 0.1 |
| *Bacteroides fragilis* | 7.2 ± 0.5 | 9.3 ± 0.1 | 9.2 ± 0.1 |
| *Clostridium* | 4.3 ± 0.1 | 5.1 ± 0.5 | 6.7 ± 0.3 |

The results are expressed in log and the figures represent the mean of the results for the 6 mice; a significant increase in *Bacteroides fragilis* and *Clostridia* is observed, hence an infectious risk.

The results obtained with a milk preparation in accordance with the invention, inoculated and having been subjected to an 8-hour contact at 37° C. with CNCM I-2219, are illustrated by table II below.

TABLE II

|  | T 0 | T 7 days | T 15 days |
|---|---|---|---|
| *Bifidobacteria* | 7.2 + 0.1 | 11 + 0.5 | 10.3 + 0.8 |
| *Bacteroides fragilis* | 8 + 0.2 | 7.9 + 0.3 | nd < 4.7 log |
| *Clostridium* | 3.9 + 0.3 | 4.4 + 0.2 | 4 (1 mouse) 5 others: absence |
| *C. perfringens* | 3.7 + 0.9 | nd | nd | nd: not determined

A 2.5 log increase in bifidobacteria and a very large reduction in *Bacteroides* and *Clostridia* is observed, relative to the control, in particular after administering for 15 days.

Studies on Monoxenic Mice with *Clostridium perfringens*:

Objective: to verify the influence of the products in accordance with the invention on the dissemination of intestinal bacteria in various organs.

Experimental condition: axenic mice (age=8 weeks) kept in a sterilized isolating unit, fed on RO3 base sterilized by irradiation.

Products tested:
ultrapure water sterilized by autoclaving
ultrapure water sterilized by autoclaving supplemented with a preparation in accordance with the invention (PII) at the rate of 14 g (weight of powder) per 100 ml of water.

These solutions are prepared in a sterile manner daily and given ad libitum to the mice for 6 days. At the end of this period, *C. perfringens* strain LAB (human intestinal origin) is inoculated at the rate of 3.5 to 4.5 log CFU per mouse. The implantation and dissemination of *Clostridium perfringens* in the lymphoid organs are measured by sacrificing two mice per group 24, 48 hours, 4 days and 7 days after inoculation. The counts are performed by the most probable number method with three tubes in LS medium (incubation 46° C. 24-48 hours).

The results are illustrated by table III below:

TABLE III

|  | D1 | | D2 | | D4 | | D7 | |
|---|---|---|---|---|---|---|---|---|
|  | PII | Water | PII | water | PII | water | PII | water |
| Ileum proximal | 2 | 2 | 0 | 1 | 0 | 2 | 2 | 2 |
| Median | 2 | 0 | 0 | 1 | 0 | 2 | 2 | 2 |
| Distal | 2 | 0 | 0 | 1 | 0 | 2 | 2 | 2 |
| Cecum | 2 | 0 | 0 | 2 | 1 | 2 | 2 | 2 |
| Colon | 2 | 2 | 0 | 2 | 2 | 2 | 2 | 2 |
| Peyer's patches | 1 | 1 | 0 | 0 | 1 | 2 | 2 | 2 |
| Mesenteric ganglia | 0 | 2 | 0 | 0 | 1 | 2 | 1 | 2 |
| Bacteriemia | 0 | 0 | 0 | 0 | 0 | 0 | 0 | 0 |
| Spleen | 0 | 1 | 0 | 2 | 0 | 2 | 1 | 2 |
| Liver | 0 | 0 | 0 | 0 | 1 | 2 | 2 | 2 |
| Kidney | 0 | 1 | 0 | 2 | 1 | 2 | 1 | 2 |
| Lung | 0 | 0 | 0 | 0 | 0 | 2 | 0 | 0 |

Legend to table III:
0 = low implantation/dissemination
1 = average implantation/dissemination
2 = high implantation/dissemination The following are observed:

a 24-hour delay in implantation of *C. Perfringens* after administration of the product in accordance with the invention;

low dissemination in the lymphoid organs in mice which consumed the product in accordance with the invention (PII).

These results show that the preparations in accordance with the invention regulate the dissemination of *Clostridium perfringens* in the lymphoid organs.

That which is claimed is:

1. A biologically pure culture of *Bifidobacterium breve* strain I-2219 deposited at the CNCM on May 31, 1999.

2. A method for the production of an immunostimulant milk product, said method comprising carrying out bioconversion of a milk substrate with the aid of a *Bifidobacterium* culture of claim 1 by keeping said milk substrate in contact with said culture, under conditions which are unfavorable to fermentation by *Bifidobacterium.*

3. The method as claimed in claim 2, wherein the milk substrate and the *Bifidobacterium* are brought into contact at a concentration of $1*10^7$ to $1*10^9$ CFU per ml of milk substrate, and the final *Bifidobacterium* concentration at the end of the bioconversion reaction is $1*10^5$ to $1*10^9$ CFU per ml of product.

4. The method as claimed in claim 3, wherein the pH of the milk substrate during the bringing into contact with the *Bifidobacterium* is 6.3 to 7 and the pH of the product at the end of the bioconversion reaction is 6 to 7.

5. The method as claimed in claim 2, wherein the duration of contact between the milk substrate and the bacteria is 6 to 24 hours.

* * * * *